United States Patent
Pinto Frutuoso et al.

(10) Patent No.: US 11,976,629 B2
(45) Date of Patent: May 7, 2024

(54) WIND SENSOR CONFIGURATION

(71) Applicant: Vestas Wind Systems A/S, Aarhus N. (DK)

(72) Inventors: Ines Pinto Frutuoso, Viana do Castelo (PT); Johnny Nielsen, Svenstrup J (DK); Jens Van Schelve, Oporto (PT)

(73) Assignee: Vestas Wind Systems A/S, Aarhus N. (DK)

( * ) Notice: Subject to any disclaimer, the term of this patent is extended or adjusted under 35 U.S.C. 154(b) by 249 days.

(21) Appl. No.: 17/629,519

(22) PCT Filed: Jul. 7, 2020

(86) PCT No.: PCT/DK2020/050206
§ 371 (c)(1),
(2) Date: Jan. 24, 2022

(87) PCT Pub. No.: WO2021/023349
PCT Pub. Date: Feb. 11, 2021

(65) Prior Publication Data
US 2022/0268255 A1    Aug. 25, 2022

(30) Foreign Application Priority Data
Aug. 2, 2019  (DK) .................. 2019 70492

(51) Int. Cl.
*F03D 7/02* (2006.01)
*F03D 17/00* (2016.01)

(52) U.S. Cl.
CPC ........... *F03D 7/0204* (2013.01); *F03D 17/00* (2016.05); *F05B 2270/32* (2013.01); *F05B 2270/321* (2013.01)

(58) Field of Classification Search
CPC .... F03D 7/0204; F03D 17/00; F05B 2270/32; F05B 2270/321; Y02E 10/72
(Continued)

(56) References Cited

U.S. PATENT DOCUMENTS

2012/0049520 A1    3/2012 Stiesdal
2013/0272877 A1    10/2013 Andersen et al.
(Continued)

FOREIGN PATENT DOCUMENTS

CN    101039090 A    9/2007
CN    101349240 A    1/2009
(Continued)

OTHER PUBLICATIONS

Danish Patent and Trademark Office, Search and Examination Report in PA 2019 70492, Jan. 24, 2020.
(Continued)

*Primary Examiner* — Giovanni Astacio-Oquendo
(74) *Attorney, Agent, or Firm* — Wood Herron & Evans LLP (57) ABSTRACT

A method for determining a relative position of wind sensors on a wind turbine comprising: obtaining wind data from each of at least two wind sensors installed on a wind turbine at a location where airflow is affected by a rotor of the wind turbine, the obtaining occurring while the rotor is rotating, identifying oscillations in the wind data from each of the wind sensors, determining a phase or amplitude difference between the oscillations, and determining a relative position of the wind sensors based on the phase or amplitude difference.

15 Claims, 5 Drawing Sheets

(58) Field of Classification Search
USPC ................................. 324/76.13, 76.12, 76.11
See application file for complete search history.

(56) References Cited

U.S. PATENT DOCUMENTS

| | | | | |
|---|---|---|---|---|
| 2020/0088166 A1* | 3/2020 | Slanitsch | ............. | G05B 19/042 |
| 2020/0208613 A1* | 7/2020 | Vad | ......................... | F03D 17/00 |
| 2020/0347823 A1* | 11/2020 | Wollesen | ............... | F03D 7/0268 |
| 2021/0108617 A1* | 4/2021 | Miranda | ............... | F03D 7/0276 |
| 2021/0363974 A1* | 11/2021 | Conrads | .................... | G01P 5/20 |
| 2022/0074390 A1* | 3/2022 | Janssen | ................... | F03D 17/00 |

FOREIGN PATENT DOCUMENTS

| | | |
|---|---|---|
| CN | 101389967 A | 3/2009 |
| CN | 103899497 A | 7/2014 |
| EP | 1505299 A1 | 2/2005 |
| EP | 1811172 A1 | 7/2007 |
| EP | 2617993 A2 | 7/2013 |
| EP | 2653722 A1 | 10/2013 |
| EP | 2860392 A1 | 4/2015 |

OTHER PUBLICATIONS

European Patent Office, International Search Report and Written Opinion in PCT Application No. PCT/DK2020/050206, Oct. 7, 2020.
China National Intellectual Property Administration, office action issued in corresponding Chinese patent application No. 202080055488.1, dated May 4, 2023, with English translation.

* cited by examiner

WIND SENSOR CONFIGURATION

FIELD OF THE INVENTION

The present invention relates to a method for configuring wind sensors installed on a wind turbine and a wind turbine including a control system for carrying out such a method.

BACKGROUND OF THE INVENTION

Wind turbines may have wind sensors mounted upon them in order to determine properties of the wind at the location of the turbine, such as wind speed and wind direction. There may also be multiple sensors installed on turbines, such as to provide redundancy or error checking. However, when the sensors are installed on the turbine, they may be misconfigured, such that it cannot be determined which measurements are being made by which sensor or measurements may be attributed to wrong sensors. This can result in erroneous measurements being obtained and, in the case of failure of a sensor, replacement of the wrong sensor.

SUMMARY OF THE INVENTION

A first aspect of the invention provides a method for determining a relative position of wind sensors on a wind turbine comprising: obtaining wind data from each of at least two wind sensors installed on a wind turbine at a location where airflow is affected by a rotor of the wind turbine, the obtaining occurring while the rotor is rotating, identifying oscillations in the wind data from each of the wind sensors, determining a phase or amplitude difference between the oscillations, and determining a relative position of the wind sensors based on the phase or amplitude difference.

This method is built on the realisation of the inventors that data collected by wind sensors may be affected by movement of the wind turbine blades near the sensors and that the effect the wind turbine blades may have on the sensors may be related to the relative position between the wind turbine blades and the wind sensors. Hence, this invention provides a means for determining whether a configuration of wind sensors on a wind turbine is correct and for determining a real world relative position of multiple wind turbine sensors.

Each wind datum may comprise a wind property value associated with a wind turbine rotor azimuth angle.

The oscillations may be oscillations in the wind property values with respect to the associated wind turbine rotor azimuth angles.

The obtaining may comprise obtaining wind data for a plurality of wind turbine rotor rotations and binning the data into bins of rotor azimuth angles.

The method may further comprise obtaining an average wind property value for each bin, and the determining of the phase or amplitude difference may be determining of the phase or amplitude difference between the oscillations of the average wind property values of the bins.

The method may further comprise obtaining a standard deviation of the wind property values within a bin, and the determining of the relative position may occur after the standard deviation has reduced below a pre-determined threshold.

The bins may extend over a range of over 360 degrees/N, where N is the number of blades on the wind turbine rotor.

The method may further comprise fitting the wind data from each of the sensors to a respective sine wave.

The at least two sensors may be installed in respective known sensor locations and the determining of the relative position may comprise determining which wind sensor is installed in which sensor location.

The sensors may be spaced apart in a direction perpendicular to an axis of rotation of the wind turbine blade rotor.

The wind sensors may be arranged to measure wind direction and the wind data may comprise wind direction values.

The wind sensors may be arranged to measure wind speed and the wind data may comprise wind speed values.

The method may further comprise processing the wind data to determine derivatives of the wind data and the determining may be based at least partly on the derivatives.

The derivatives may be determined with respect to time or with respect to rotor azimuth angle.

According to a second aspect of the invention, there is provided a wind turbine comprising: at least two wind sensors, a rotor; and a control system arranged to carry out a method according to the first aspect.

BRIEF DESCRIPTION OF THE DRAWINGS

Embodiments of the invention will now be described with reference to the accompanying drawings, in which.

DETAILED DESCRIPTION OF EMBODIMENT(S)

Wind data as defined in this specification is any information including properties of wind, such as wind speed or wind direction.

A wind sensor is a sensor for measuring wind, such as for measuring wind speed or wind direction. An anemometer or wind vane could be considered as a wind sensor, as could an ultrasonic wind sensor.

The wind sensors used may be ultrasonic sensors which measure both wind speed and wind direction. The sensors may carry out sampling of wind speed every 0.1 seconds, or at a rate of 10 hertz.

Binning as defined in this specification is the collection of data into groups of data (known as bins). For example, data may be binned by wind turbine rotor azimuth angle by collecting data points having similar wind turbine azimuth angles. As a more specific example, all data points having wind turbine azimuth angles between 0° and 5° may be collected in a single bin and may have their values averaged, giving average values for that bin for wind property values and/or for wind turbine rotor azimuth angles.

Figure 1:
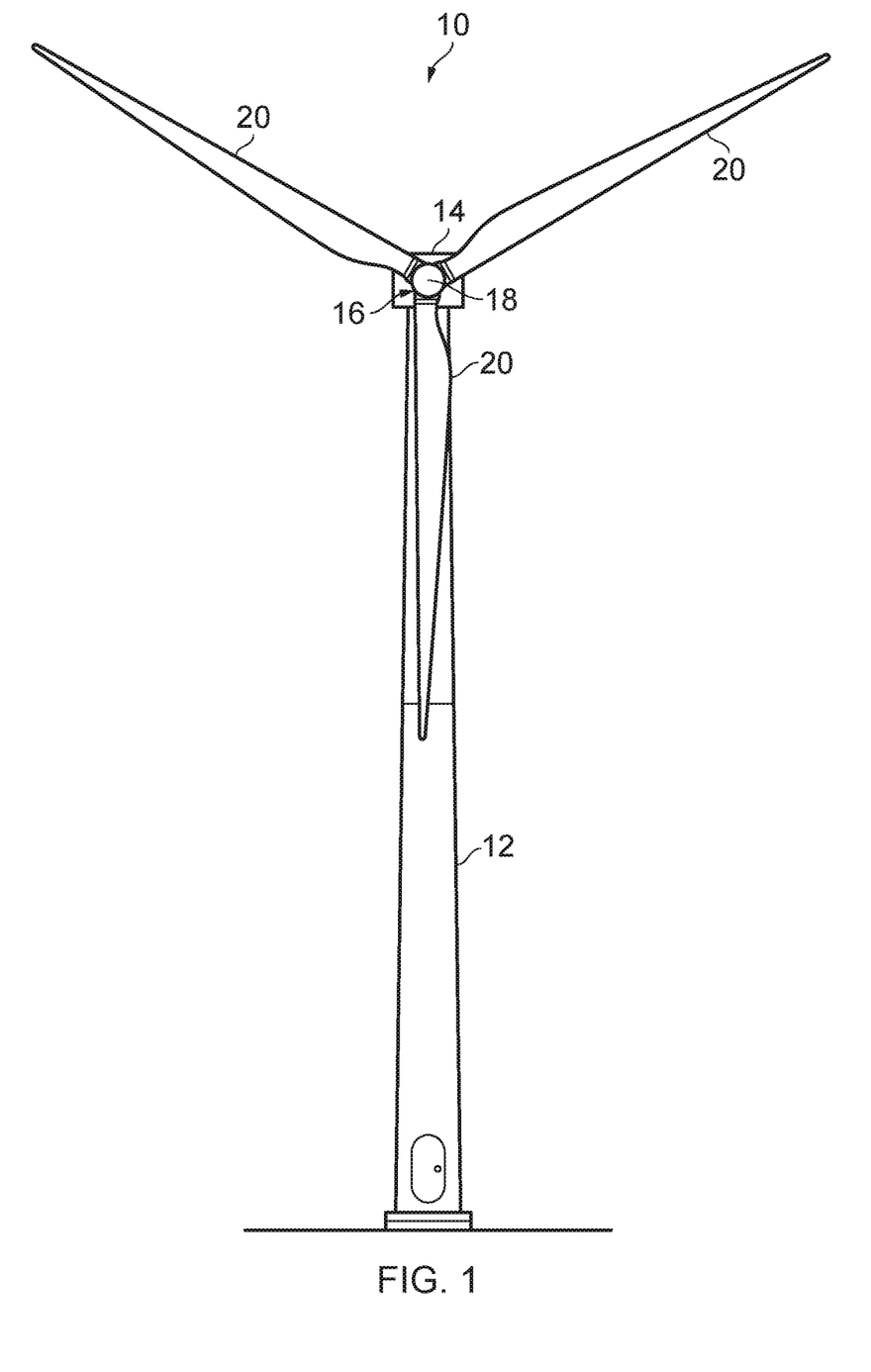
FIG. 1 shows a wind turbine.

FIG. 1 shows a horizontal axis wind turbine, upon which wind sensors may be installed. The wind turbine 10 has a tower 12 and a nacelle 14 at the top of the tower 12. A wind turbine rotor 16 is connected to the nacelle 14 and arranged to rotate relative to the nacelle 14 about a horizontal axis. The wind turbine rotor 16 comprises a wind turbine hub 18, and multiple wind turbines blades 20 extending from the hub 18. While a wind turbine rotor 16 having three blades 20 is shown, a different number of blades, such as two or four, may be used.

Figure 2:
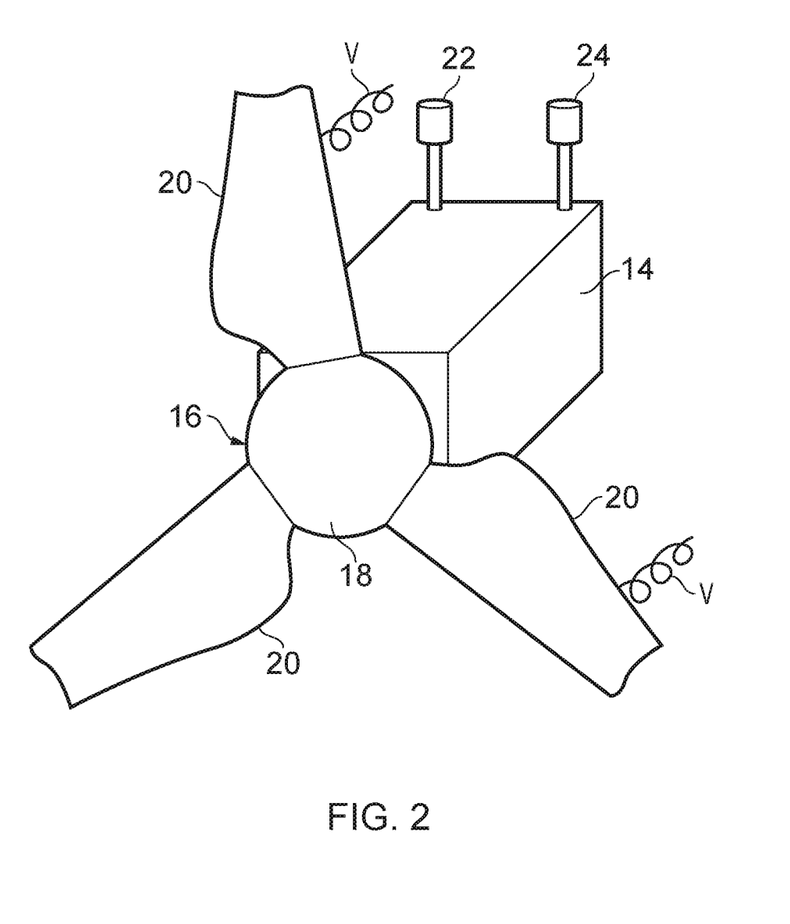
FIG. 2 shows an enlarged view of the top portion of a wind turbine.

Two or more wind sensors 22, 24 may be installed on the nacelle 14 of the wind turbine 10, as shown in FIG. 2. FIG. 2 also shows how vortices V may be shed from the wind turbine blades 20 and may propagate downstream, thus affecting the air around the wind sensors 22, 24. The vortices V may travel with the prevailing wind from the rotor 16 past the wind sensors 22, 24 as the nacelle 14 may rotate about a vertical axis so that the rotor 16 faces into the prevailing wind.

As the wind turbine rotor 16 rotates, the blades 20 will each pass in front of the wind sensors 22, 24 and the vortices V shed from each blade 20 may each impinge on the wind sensors 22, 24 so as to change the readings from those sensors.

The direction of rotation of the rotor 16 may be known to an operator, and the rotor 16 may rotate in a clockwise direction as viewed from the front.

The first and second wind sensors 22, 24 may each obtain wind data by detecting the speed of movement or direction of movement of the air around them. This data may then be transferred to a control system.

Simultaneously, a rotor position sensor may sense the position of the rotor 16 and obtain rotor position data, such as rotor azimuth angle and may transfer this rotor position data to the central control system. The wind data from each sensor may thereby be associated with corresponding rotor position data.

By plotting the wind data against time or against rotor azimuth angle, or by otherwise comparing the wind data, oscillations in the wind data may be seen, and such oscillations may have a sinusoidal quality. A phase difference or amplitude difference in the oscillations of the data may be determined and from this difference a difference in the relative positions of the wind sensors from which the wind data are obtained relative to the wind turbine rotor may be determined.

When fitting a sine wave to the wind data, the sine wave's period in terms of rotor azimuth angle may be known as the number of blades is known and therefore only the amplitude and phase of the wave must be determined. Alternatively, the period in terms of time may be known if the speed of rotation of the rotor is known.

In order to save computation and time, the fitting of a sine wave may be performed only after a standard deviation for the data has reduced below a pre-determined threshold. Alternatively, a test sine wave may be fitted and a closeness of fit between the test sine wave and the measured signal may be evaluated for determining the stability of the measurements.

Figure 3A:
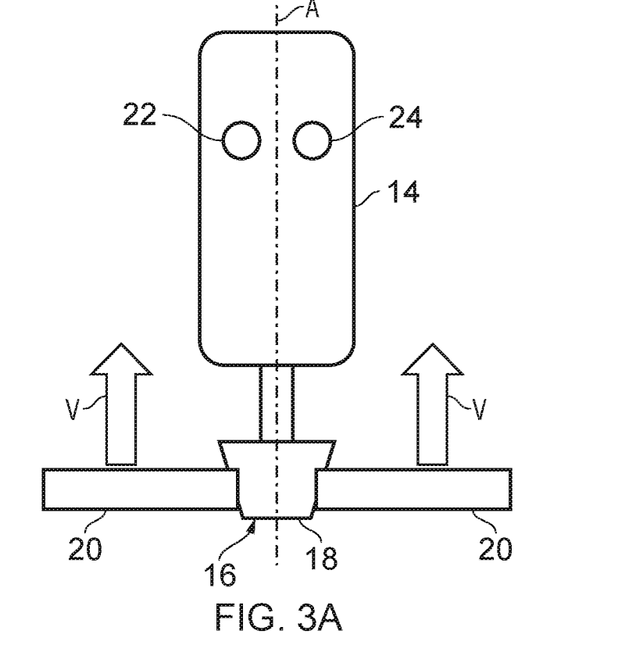
FIG. 3a shows a plan view of a first wind turbine.
Figure 3B:
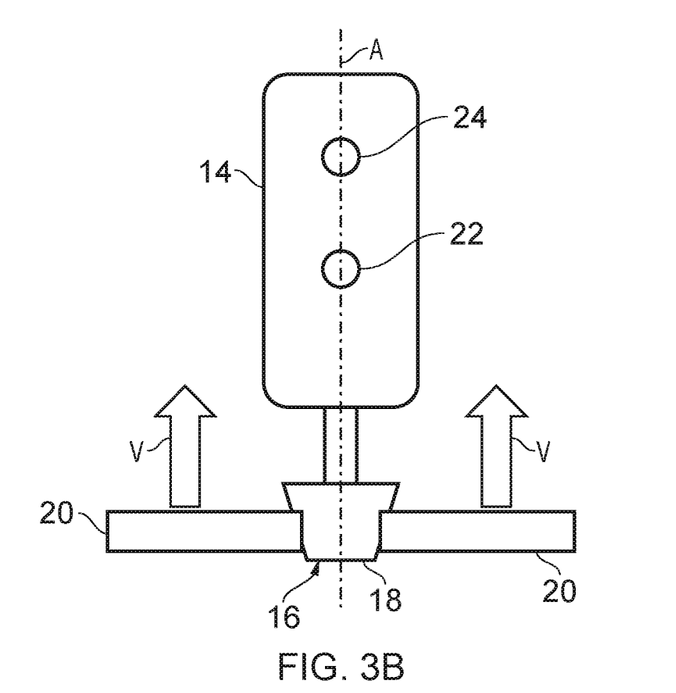
FIG. 3b shows a plan view of a second wind turbine.
Figure 4A:
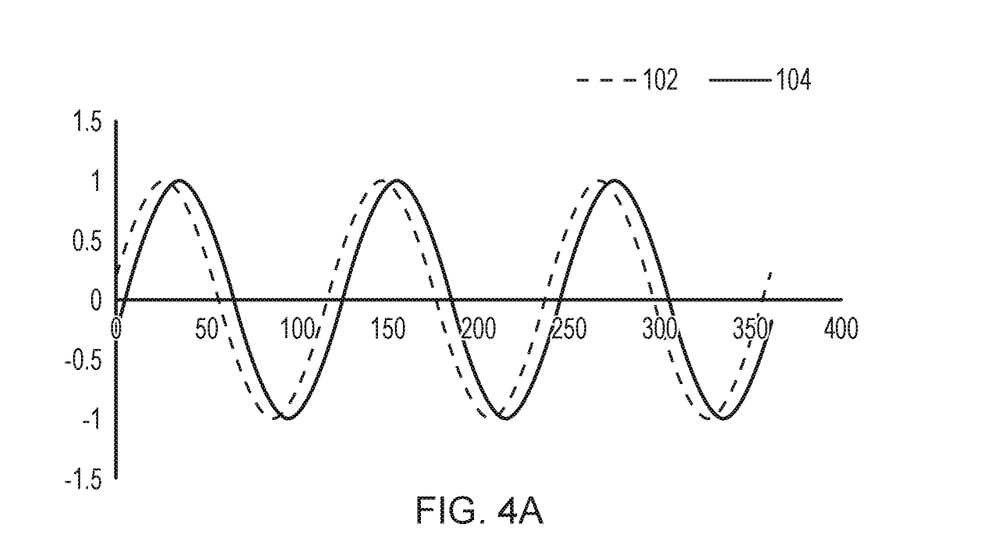
FIG. 4a shows data obtained from the first wind turbine.
Figure 4B:
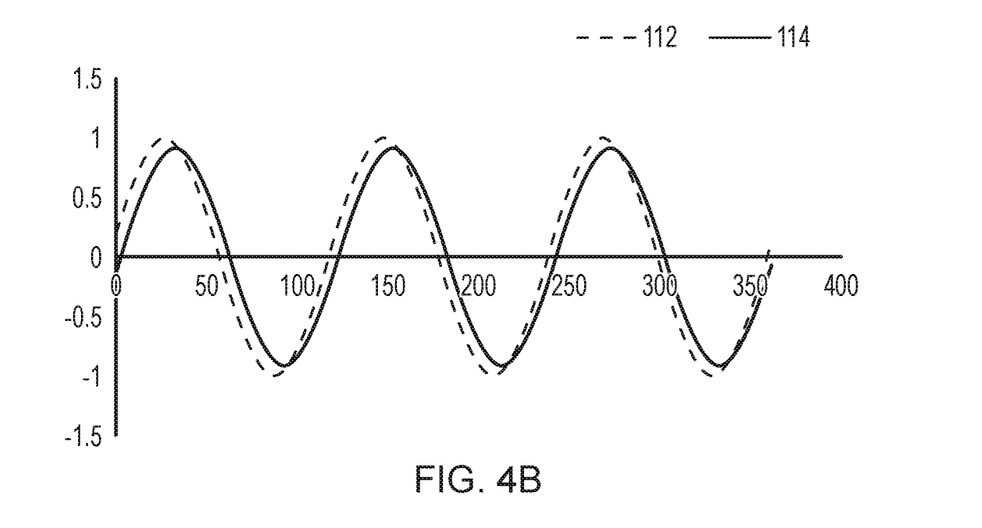
FIG. 4b shows data obtained from the second wind turbine.

FIGS. 3a and 3b show two possible arrangements of the wind sensors 22, 24 on the nacelle 14 and FIGS. 4a and 4b show corresponding wind data graphs illustrative of data likely to be obtained by the respective sensor arrangements.

Looking firstly to the arrangement in FIG. 3a and the corresponding data shown in FIG. 4a, the first and second wind sensors 22, 24 may be spaced apart in a direction perpendicular to the axis A about which the rotor 16 rotates. In an example where the wind turbine 16 is rotating in a clockwise direction, the blade 20 will pass first in front of the first wind sensor 22 and then in front of the second wind sensor 24. Therefore, each vortex V will pass first over the first wind sensor 22 and second over the second wind sensor 24.

The first wind sensor 22 may obtain first wind data and the second wind sensor 24 may obtain second wind data.

FIG. 4a shows how the first and second wind data obtained from the respective sensors may vary with rotor position for the arrangement shown in FIG. 3a. The Y axis shows a normalised wind property, such as normalised wind speed, normalised wind direction, or normalised derivatives of wind speed or wind direction, and the X axis shows rotor azimuth angle in degrees. The first wind data is plotted with dotted line 102 and the second wind data is plotted with solid line 104.

While exact sine waves are shown, the data obtained from the sensors may deviate from an exact sine wave. In some methods, there may be points plotted for every wind property value, and the sine wave may be a best-fit line through these points. Alternatively, there may be only one point plotted for each dataset every 5°, as the data may be binned and averaged into bins of 5°.

In both cases, a test sine wave may be formulated and may be evaluated for closeness of fit to the data. If the fit is sufficiently close, then the method of determining the configuration of the wind sensors may proceed, otherwise more data may be gathered and a new test sine wave may be formulated. The closeness of fit may be determined using a least-squares method.

When data is binned and averaged, a standard deviation or variance for the data in each bin may be determined, and a sine wave may be plotted when the standard deviation or variance is below a required threshold.

The sine wave may be fixed to have a period of 120° for a three-bladed wind turbine, thereby reducing the amount of computation necessary for formulating the sine wave. The data may also be normalised so that there is an average wind property value of 0, meaning that the only variables for the sine wave may be phase and amplitude.

Since the blades 20 each pass in front of the first wind sensor 22 before they pass in front of the second wind sensor 24, the oscillations in wind property of the first wind data 102 due to the vortices V may exhibit a phase difference from the oscillations of the second wind data 104. It will be seen that the first wind data may lead the second wind data, or it could be perceived that the second wind data may lag behind the first wind data. By determining the phase difference between the oscillations in the data obtained from the two sensors 22, 24, it can be determined that the blades 20 must pass in front of the first sensor 22 before they pass in front of the second sensor 24 and therefore the relative positions of the two sensors can be determined. In some examples, it may be possible to relate the magnitude of the phase difference to the magnitude of the distance between the sensors 22, 24.

From the phase difference, and the fact that the rotor 16 is rotating in a clockwise direction, it can be determined that the first wind sensor 22 is positioned in an anticlockwise direction relative to the second wind sensor 24.

Turning to the arrangement shown in FIG. 3b, this shows the first and second wind sensors 22, 24, spaced apart in a direction along the axis of rotation A of the wind turbine rotor 16. The vortices V affecting the first and second wind sensors 22, 24 may be detected at a differing phase, since the vortices V may be carried by the prevailing wind and may therefore affect the first wind sensor 22 before they affect the second wind sensor 24, because the first wind sensor 22 may be located nearer to the wind turbine rotor 16 than the second wind sensor 24 may be. The vortices V may also dissipate as they propagate downstream and therefore the amplitude of the oscillations of wind properties measured by the first wind sensor 22 may be greater than the oscillations of wind properties measured by the second wind sensor 24.

As a result, wind data obtained from the first and second wind sensors 22, 24 may be obtained as illustrated in FIG. 4b. In FIG. 4b, the first wind data obtained from the first wind sensor 22 is shown by the dotted line 112, and has a greater amplitude of oscillation than the second wind data obtained from the second wind sensor 24, shown by the solid line 114. The phase difference between the oscillations from first wind data and the second wind data also shows that the oscillations in the first wind data lead those in the second wind data.

Since the first wind data has oscillations of a greater amplitude than the second wind data, it can be determined that the first wind sensor 22 is located closer to the rotor 16 than the second wind sensor is located 24. This can also be determined from the phase difference between the oscillations.

As can be seen from FIGS. 4a and 4b, the oscillations repeat three times per rotation of the rotor 16, because the rotor 16 has three wind turbine blades 20. This effect can be exploited by obtaining wind data which comprises a wind property and a rotor azimuth angle associated with the measured wind property. The rotor azimuth angle may be divided by three or otherwise manipulated, so that it is within an azimuth angle range spanning 120°. Thereby the data from the vortices V due to each of the wind turbine blades 20 may be combined, thus tripling the density of the data and allowing wind data to be obtained with a good level of stability (i.e. a low standard deviation) in a shorter time. It will also be understood that comparable methods may be performed for wind turbine rotors having different numbers of blades.

In order to further improve the stability of the data, the wind data may be binned into bins of rotor position, e.g. bins covering 5 degrees of rotor position. The bins may then be averaged so that the resulting data to be plotted contains only one data point for every 5 degrees of rotor position, that data point being an average value for the relevant bin.

While the wind data referred to above may be wind speed data or wind direction data, derivatives of wind speed and derivatives of wind direction may also be used. A derivative may be determined by calculating the difference between a measurement and a chronologically adjacent measurement. By using an instantaneous derivative such as this, the data may better reflect changes in wind property due to the presence of the wind turbine blades, as opposed to detecting fluctuations in the prevailing wind.

In the method, only a portion of obtained wind data might be used for determining the relative position of the wind sensors. For example the wind sensors 22, 24 may measure wind speed and wind direction, and both of these properties may be stored and used for analysis, but it may be that only the wind direction data, or a derivative thereof, is used for determining the relative position of the wind sensors 22, 24.

Figure 5A:
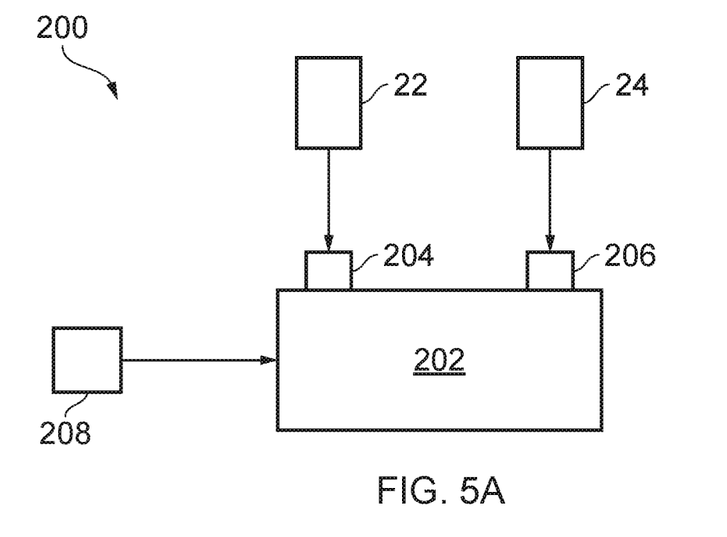
FIG. 5a shows a control system for a wind turbine.
Figure 5B:
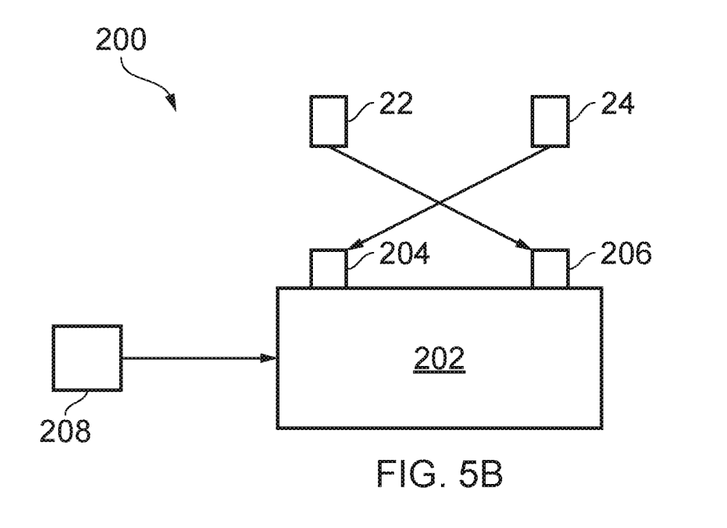
FIG. 5b shows a differently arranged control system for a wind turbine.

The methods described above may be implemented by a control system, such as those shown in FIGS. 5a and 5b.

FIG. 5a shows a wind turbine system 200 comprising a control system 202, the control system 202 having a first port 204 and a second port 206, the ports each being arranged to receive data from a wind sensor. In FIG. 5a, the first wind sensor 22 is connected to the first port 204 and the second wind sensor 24 is connected to the second port 206. The control system 202 may also be configured to receive data from a wind turbine position sensor 208. The control system 202 may associate wind data received from the respective wind sensors 22, 24 with a contemporary wind turbine rotor azimuth angle received from the wind turbine rotor position sensor 208. The control system 202 may then carry out any of the above described methods in order to determine the relative positions of the first and second wind sensors 22 and 24.

FIG. 5b shows an incorrectly installed wind turbine system 200. The first wind sensor 22 is connected to the second port 206 and second wind sensor 24 is connected to the first port 204.

Without the methods described above, the difference in arrangements between FIG. 5a and FIG. 5b would not necessarily be perceptible to an operator receiving data from the wind sensors and therefore the wrong wind sensor may be replaced in case of failure or the wrong correction function may be applied to the wrong wind sensor. For example, the correction function may convert a measured wind parameter at a given sensor location by a given sensor to a free flow wind in front of the rotor.

Although the invention has been described above with reference to one or more preferred embodiments, it will be appreciated that various changes or modifications may be made without departing from the scope of the invention as defined in the appended claims.

The invention claimed is:

1. A method for determining a relative position of wind sensors on a wind turbine comprising:
   obtaining wind data from each of at least two wind sensors each installed on a wind turbine at a respective location spaced apart from the other wind sensor where airflow is affected by a rotor of the wind turbine, the obtaining occurring while the rotor is rotating,
   identifying oscillations in the wind data from each of the wind sensors,
   determining a phase or amplitude difference between the oscillations, and
   determining a relative position of the wind sensors based on the phase or amplitude difference.

2. The method of claim 1, wherein each wind datum comprises a wind property value associated with a wind turbine rotor azimuth angle.

3. The method of claim 2, wherein the oscillations are oscillations in the wind property values with respect to the associated wind turbine rotor azimuth angles.

4. The method of claim 1, wherein the obtaining comprises obtaining wind data for a plurality of wind turbine rotor rotations and binning the data into bins of rotor azimuth angles.

5. The method of claim 4, further comprising obtaining an average wind property value for each bin, and wherein the determining of the phase or amplitude difference is determining of the phase difference between the oscillations of the average wind property values of the bins.

6. The method of claim 4, further comprising obtaining a standard deviation of the wind property values within a bin, and wherein the determining the relative position occurs after the standard deviation has reduced below a predetermined threshold.

7. The method of claim 4, wherein the bins extend over a range of only 360°/N, where N is the number of blades on the wind turbine rotor.

8. The method of claim 1, further comprising fitting the wind data from each of the sensors to a respective sine wave.

9. The method of claim 1, wherein the at least two sensors are installed in respective known sensor locations and wherein the determining a relative position comprises determining which wind sensor is installed in which sensor location.

10. The method of claim 1, wherein the sensors are spaced apart in a direction perpendicular to an axis of rotation of the wind turbine blade rotor.

11. The method of claim 1, wherein the wind sensors are arranged to measure wind direction and wherein the wind data comprise wind direction values.

12. The method of claim 1, wherein the wind sensors are arranged to measure wind speed and wherein the wind data comprise wind speed values.

13. The method of claim 1, further comprising processing the wind data to determine derivatives of the wind data and wherein the determining is based at least partly on the derivative.

14. The method of claim 13, wherein the derivative is determined with respect to time.

15. A wind turbine comprising:
   at least two wind sensors,
   a rotor; and
   a control system arranged to carry out the method of claim 1.

* * * * *